United States Patent [19]
Elko et al.

[11] Patent Number: 5,394,554
[45] Date of Patent: Feb. 28, 1995

[54] INTERDICTING I/O AND MESSAGING OPERATIONS FROM SENDING CENTRAL PROCESSING COMPLEX TO OTHER CENTRAL PROCESSING COMPLEXES AND TO I/O DEVICE IN MULTI-SYSTEM COMPLEX

[75] Inventors: David A. Elko; John F. Isenberg, Jr.; Allan S. Meritt; Brian B. Moore, all of Poughkeepsie; Jeffrey M. Nick, Fishkill; William C. Shepard, Hyde Park; David H. Surman, Milton; Michael D. Swanson, Poughkeepsie, all of N.Y.

[73] Assignee: International Business Machines Corporation, Armonk, N.Y.

[21] Appl. No.: 860,489

[22] Filed: Mar. 30, 1992

[51] Int. Cl.⁶ .............................................. G06F 13/00
[52] U.S. Cl. ................................... 395/800; 395/575; 395/275; 364/238.4; 364/260.1; 364/284.2; 364/284.3; 364/DIG. 1
[58] Field of Search .............. 395/800, 575, 325, 550, 395/275; 364/200; 371/8.2, 11.2, 67.1, 68.1, 68.2, 68.3; 370/54, 60, 85.7, 95.1

[56] References Cited

U.S. PATENT DOCUMENTS

| | | | |
|---|---|---|---|
| 4,356,546 | 10/1982 | Whiteside et al. | 395/575 |
| 4,631,661 | 12/1986 | Eibach et al. | 395/575 |
| 4,875,037 | 10/1989 | Escolar | 371/8.2 |
| 4,975,914 | 12/1990 | Ashton et al. | 371/11.2 |
| 5,027,269 | 6/1991 | Grant et al. | 364/200 |
| 5,043,881 | 8/1991 | Hamazaki | 364/200 |
| 5,065,311 | 11/1991 | Masai et al. | 395/575 |
| 5,121,486 | 6/1992 | Kurihara et al. | 395/325 |
| 5,247,664 | 9/1993 | Thompson et al. | 395/600 |
| 5,253,184 | 10/1993 | Kleinschmitz | 364/550 |
| 5,265,240 | 11/1993 | Galbraith et al. | 395/550 |

*Primary Examiner*—Alyssa H. Bowler
*Assistant Examiner*—Alpesh M. Shah
*Attorney, Agent, or Firm*—Floyd A. Gonzalez

[57] ABSTRACT

In a multi-system complex having central processing complexes (CPCs) and subsystems, a hardware facility for prompt interdicting I/O and message operations. A CPC or subsystem failure causes as interruption in the availability of the data bases to the attached network of terminals. Often such networks have thousands of terminals. Even a short loss of data is detrimental. Therefore the CPC or subsystem takeover must be accomplished as quickly as possible and the I/O attached to the failing CPC or subsystem must be interdicting to release it for use to the rest of the complex. The disclosed hardware facility provides a mechanism which is program initiated and controlled and which guarantees the prompt completion of the interdiction function.

25 Claims, 9 Drawing Sheets

INTERDICTING I/O AND MESSAGING OPERATIONS FROM SENDING CENTRAL PROCESSING COMPLEX TO OTHER CENTRAL PROCESSING COMPLEXES AND TO I/O DEVICE IN MULTI-SYSTEM COMPLEX

BACKGROUND OF THE INVENTION

The present invention relates to a facility in a multi-system complex in which one software subsystem has the remote capability for interdicting or fencing I/O and messaging operations of another software subsystem.

A facility provides a program interface for the control of fencing operations. In particular, fencing commands manipulate the state of an authorization vector or CPC-isolation indicator at a remote CPC, and, in some cases, initiate a terminating function at that CPC. The terminating function scans all active I/O and message operations, terminating the appropriate operations as determined by the new state of the authorization vector or isolation indicator. Thereafter, the initiation of new I/O and message operations is regulated by the new state of the authorization vector or isolation indicator.

SUMMARY OF THE INVENTION

The present invention includes multiple central processing complexes (CPCs), each of which includes a central processor, central storage, and a channel subsystem. The channel subsystem includes channels of a first type which connect to I/O devices, and channels of a second type which connect to a coupling facility. The I/O devices are communicated with using well understood channel command words (CCWs) which are executed by a START SUBCHANNEL instruction, and the coupling facility is communicated with by means of messages which may be sent from a CPC to the coupling facility by a SEND MESSAGE instruction or from the coupling facility to a CPC. Responses to the messages are returned to complete a message operation. The present invention provides a facility for interdicting I/O and message operations at a remote CPC in a timely manner. A subsystem failure causes an interruption in the availability of the data base to the attached network of terminals. Often such networks have thousands of terminals. Even a short loss in data availability is detrimental. Thus a subsystem takeover must be accomplished as quickly as possible. The takeover process must avoid the need for human intervention. Fencing is a critical function in the takeover process. Thus, the new facility provides a mechanism which is program initiated and controlled, and which guarantees the completion of the fencing function while meeting these timing requirements.

Also provided are two levels of granularity—subsystem-level fencing and CPC fencing. Large CPCs support many subsystems. For instance, a single CPC may run a large IMS application and concurrently, several hundred TSO users. A failure isolated to IMS should not impact the TSO users. Thus, the new facility provides a mechanism that fences the I/O and message operations initiated by the IMS subsystem, or by system services on behalf of IMS, but allows the corresponding operations for the TSO users to continue normally.

Termination of I/O and message operations may be requested with one of three options: no termination; termination at command boundaries; forced termination of active operations.

CPC fencing is also required to remove a CPC from a multisystem complex by programmed means. This function is used for software and hardware maintenance, failures, and for installing new levels of software.

The present invention also includes mechanisms that protect the CPC from unauthorized fencing actions. Fencing commands originate at other CPCs and are received at an I/O-authorization facility through an external interface. Thus, the new facility provides a mechanism for protecting the CPC against fencing actions which originate outside the CPC in which the fencing action is to take place (target CPC).

It is thus a primary object of the present invention to provide a hardware facility for fencing I/O and message operations by one subsystem in a timely manner via program initiation and program control in another subsystem.

It is another object of this present invention to provide two or more levels of granularity for fencing I/O and messaging. Levels for fencing I/O and messaging include subsystem level fencing and CPC level fencing.

It is another object of this present invention to provide a mechanism for protecting subsystems and CPCs from unauthorized fencing actions. The unauthorized fencing actions include protection against fencing actions which originate outside the CPC in which the fencing action is to take place.

It is another object of this present invention to provide support for logical partitioning consistent with IBM PR/SM facility, wherein fencing-facility partitions match CPC partitions, subchannels are provided for each partition, fencing commands and processes are performed with respect to designated partitions and fencing controls is replicated per partition.

It is another object of this present invention to provide an authorization vector in an I/O authorization facility at the designated remote CPC to regulate access to I/O and message operations. The authorization vector is a sequentially numbered set of elements, each for controlling access to I/O and message devices.

It is another object of this present invention to provide three or more types of I/O termination control. The I/O termination types include immediate termination, termination at command boundaries and no termination requested.

These and other objects of the present invention will be apparent from the following more particular description of the preferred embodiment of the invention as illustrated in the drawings.

DESCRIPTION OF A PREFERRED EMBODIMENT

Figure 1:
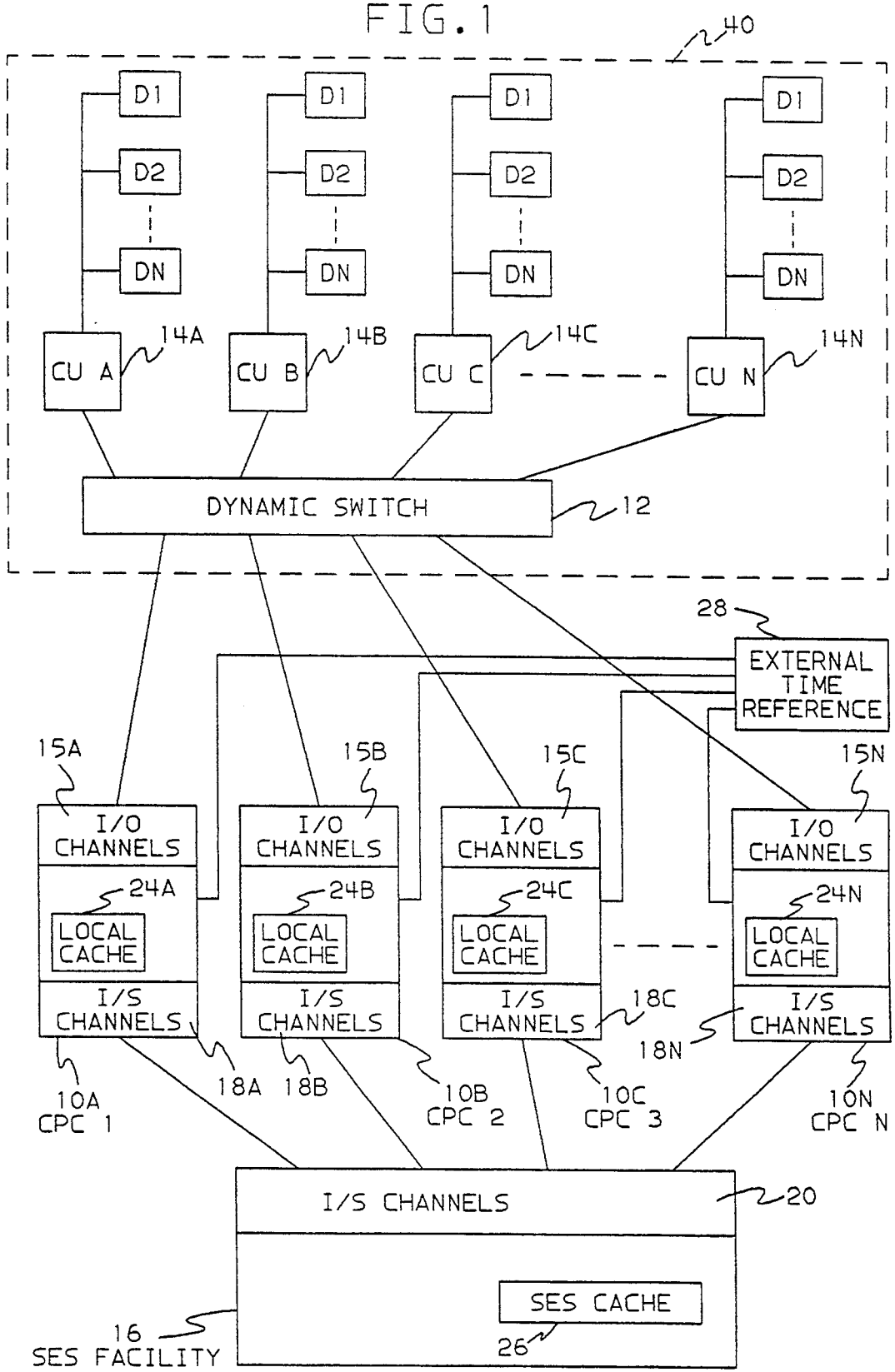
FIG. 1 is a block diagram of a data processing system of the present invention having multiple CPCs connected to an I/O system and a SES facility.

FIG. 1 is a block diagram of a data processing system using the present invention. The system of FIG. 1 includes multiple central processing complexes (CPCs) 10A through 10N which are connected to an input/output (I/O) system including a dynamic switch 12 controlling access to multiple I/O control units 14A through 14N. Each of the control units 14A through 14N controls one or more direct access storage devices (DASD) D1 through DN as shown. The dynamic switch 12 may be an ESCON Director dynamic switch available from IBM Corporation, Armonk, N.Y. Such a dynamic switch is disclosed in U.S. Pat. No. 5,107,489 for Switch and its Protocol for making Dynamic Connections issued Apr. 21, 1992 and assigned to the owner of the present invention, which patent is incorporated herein by reference. As is known, I/O commands and data are sent from a CPC to an I/O control unit through the dynamic switch 12 by means of I/O channels 15A through 15N of the respective CPCs 10A through 10N. Channel programs for a particular I/O channel are established by channel command words (CCWs) as is well known in the art.

Each of the CPCs 10A–10N are connected to a structured-external-storage (SES) facility 16, which contains storage accessible by the CPCs and which performs operations requested by programs in the CPCs. Each CPC 10A–10N contains intersystem (I/S) channels 18A–18N, respectively, which are connected to I/S channels 20 in the SES facility 16. The SES facility 16 is also referred to herein as a coupling facility. Even though only one SES facility 16 is shown in the embodiment of FIG. 1, it will be understood that multiple SES facilities may be provided for, each with its own I/S channels and message paths connected to all or some subset for the CPCs 10A–10N. It will be understood that the I/O channels 15 are part of the well known channel subsystem (CSS), which CSS also includes the I/S channels 18 disclosed herein, even though channels 15 and 18 are shown separately in FIG. 1 for convenience.

Each of the CPCs 10A–10N has a local cache 24A–24N, respectively, and the SES facility 16 contains one or more SES caches 26. The DASD devices D (referred to herein collectively as DASD 40), the local caches 24A–24N and the SES cache 26 form a three-level storage hierarchy. The lowest level of storage is the DASD 40, the intermediate level of storage is the SES cache 26, and the highest level is the local caches 24A–24N. The local caches 24A–24N are many times referred to herein as the local cache 24.

Each of the CPCs 10A–10N may be an IBM system following the Enterprise Systems Architecture/390 Principles of Operation as described in IBM publication SA22-7201-00. Each of the CPCs 10A–10N includes one or more central processing units (CPUs) which executes an operating system, such as IBM's MVS operation system, for controlling execution of programs for processing data, as is well known. One such program performs many of the SES operations mentioned herein. This program is referred to herein as "the program." Individual instructions of the program are identified as "CPU instructions."

An external time reference (ETR) 28 provides time stamps of control information to be written into a log to document recovery from failures, backing out of undesired operations, and for audit trails. The ETR 28 synchronizes the time clocks (not shown) of the CPCs 10A–10N to a precision equal to or less than the duration of the shortest externally visible operation, and uses fiber optic interconnect cables. The ETR 28 provides for cable length propagation time differences where those differences are important in order to be able to maintain synchronization to within the length of the mentioned external operation.

Figure 2:
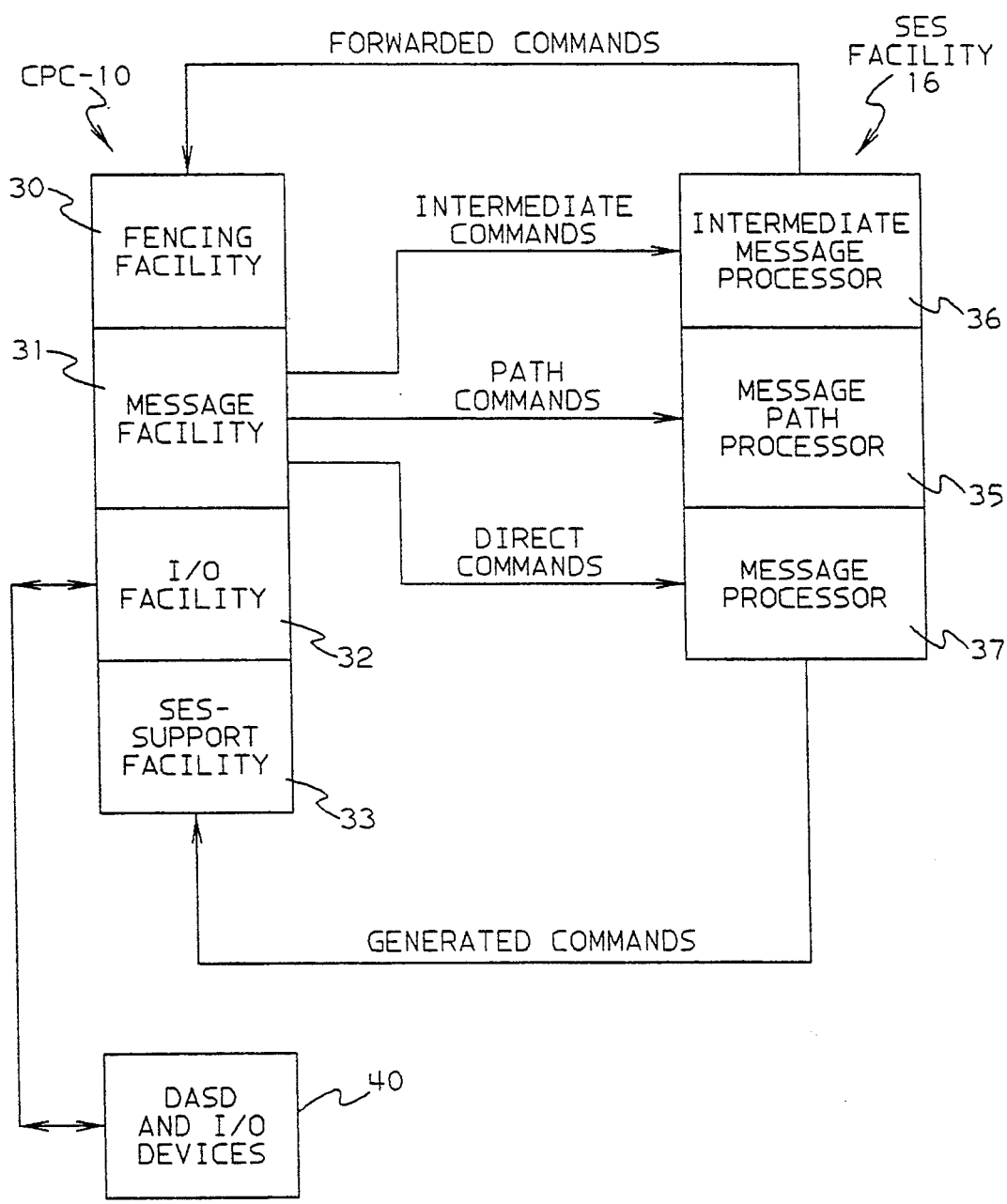
FIG. 2 is a portion of the system of FIG. 1 and shows several facilities of a single CPC connected to processors of the SES facility.

FIG. 2 shows a single CPC 10 connected to the SES facility 16. The CPC 10 includes a fencing facility 30, a message facility 31, an I/O facility 32 and a SES-support facility 33. The SES facility 16 includes a message-path processor 35, an intermediate-message processor 36, and a message processor 37. The message-path processor 35 executes message-path commands and performs message-path functions. The intermediate-message processor 36 forwards intermediate message commands to remote message processors such as the fencing facility 30. The message processor 37 supports structured storage of the list and cache type, to be explained herein in connection with FIG. 4.

Figure 3:
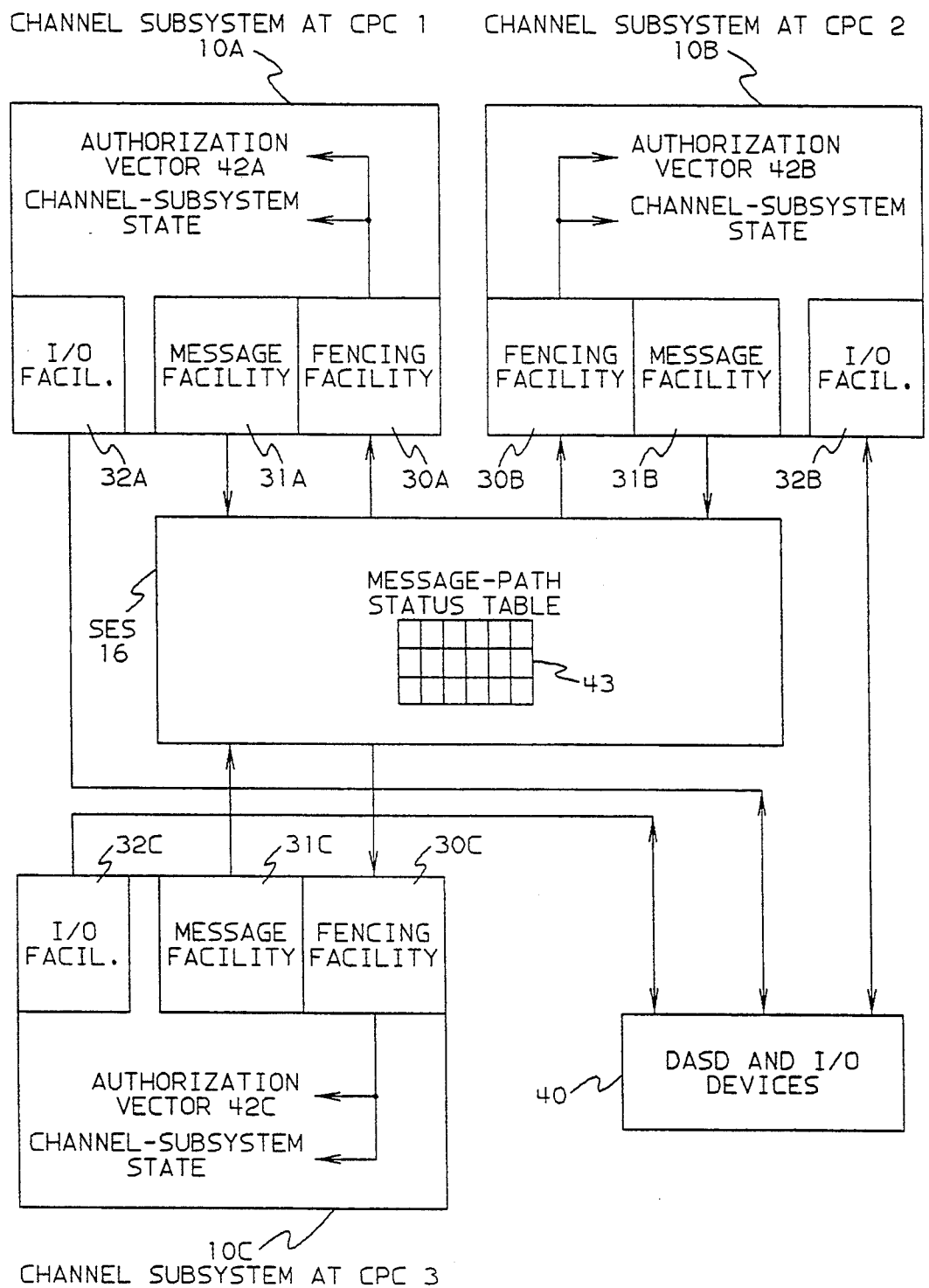
FIG. 3 is another portion of the system of FIG. 1 and shows an intermediate message processor of the SES facility and three CPCs.

The I/O facility 32 performs I/O operations and executes channel programs with DASD and I/O devices represented in FIGS. 2 and 3 at 40. The START SUBCHANNEL instruction is used to initiate an I/O operation in a manner well known in the art. The I/O facility is described the aforementioned ESA/390 Principles of Operation.

The message facility 31 performs message operations with the SES processors 35, 36 and 37, and with the fencing facilities 30. The SEND MESSAGE instruction is used to initiate a message operation with a SES facility 16 or fencing facility 30. This facility and instruction are disclosed in U.S. patent application Ser. No. 07/860,380 filed Mar. 30, 1992 for "Communicating Messages Between Processors and a Coupling Facility" by D. A. Elko et al (Attorney Docket No. PO9-91-006), incorporated herein by reference.

The fencing facility 30 executes commands that are received from other message facilities via the intermediate message processor. The commands are often issued by programs running on other CPCs. The commands operate on an authorization vector and a channel-subsystem-state indication, to be explained.

The SES-support facility 33 performs SES functions in the CPC 10 and executes commands generated by the message processor 37 in the SES facility 16.

Five separate types of message commands are defined and communicated between the hardware components of the SES facility 16 and the CPC 10. Path commands are communicated from the message facility 31 to the message path processor 35 via the SEND MESSAGE instruction over a selected message path associated with the subchannel. Path selection is performed by the control program of the CPC 10. Three path commands are defined: identify message path, activate message path and deactivate message path.

The program uses the SEND MESSAGE (SMSG) instruction to initiate an operation by the message processor 37 of FIG. 2. Execution of the message-processor operation is accomplished by sending command information to the SES facility 16 and returning response information summarizing the result. Additionally, the command may specify the transfer of data from main storage to SES storage, a SES-write operation, or the transfer of data from SES storage to main storage, a SES-read operation.

Direct commands are communicated from the message facility 31 to the message processor 37 via the SEND MESSAGE instruction over a selected message path associated with the subchannel. Path selection is performed by the channel subsystem or CPU and the direct command must be communicated on an active message path. The direct command may also include a data transfer operation. Direct commands are not forwarded, but may generate one or more commands. The classes of direct commands include: global commands, retry-buffer commands, cache-structure commands, and list-structure commands.

Generated commands are communicated from the message processor 37 to the SES-support facility 33 in a designated CPC over a message path selected by the message processor 37 from the path group for the system. The SES support facility comprises a processor for execution of the generated commands communicated over a message path. Path selection is performed by the message-path processor 35. No data transfer occurs. Generated commands must be communicated on an active message path. The generated commands include the cross-invalidate and list-notification commands, to be explained. Depending on the command, processing of the generated commands may or may not complete prior to completion of the associated direct command. However, a direct command does not complete before the action intended by the generated command is assured.

Intermediate commands are communicated for the message facility 31 to the intermediate-message processor 36 via the SEND MESSAGE instruction over a selected message path associated with the subchannel. Path selection is performed by the channel subsystem or CPU. Intermediate fencing commands are forwarded to the fencing facility 30 in a designated CPC.

Forwarded commands are communicated from the intermediate message processor 36 to a message processor. Path selection is performed by the message-path processor 35. Forwarded commands must be communicated on an active message path. Exactly one forwarded command is processed for each intermediate command that is received at the intermediate message processor 36. Processing of the forwarded command must complete prior to completion of the associated intermediate command.

Command execution characteristics at the SES facility 16 are disclosed in U.S. Pat. No. 5,317,739 issued May 31, 1994 for "Method and Apparatus for Coupling Data Processing Systems" to D. A. Elko et al., incorporated herein by reference.

All communications to a SES facility 16 from the CPC 10 may use the same message path, depending on the configuration, regardless of whether the destination is the message processor 37, message-path processor 35, or intermediate-message processor 36. All communications from the SES facility 16 to a CPC 10 may also use the same set of message paths, depending on the configuration, regardless of whether the destination is the fencing facility 30 or the SES-support facility 33.

The fencing facility 30 is a component of the ESA/390 channel subsystem. Fencing commands are issued by CPU programs, but they are executed by fencing facilities. Command execution involves fetching request operands from main storage, operating on storage objects at the fencing facility, and storing response operands in main storage.

Eight mechanisms exist for message paths: identification, activation, testing, deactivation, delivery of cross-invalidate or list notification commands, direct commands, responses and delivery of fencing commands.

Message-path identification and activation is performed by the CPU program to allow for selective configuration of links for communicating commands. Testing is performed for subsequent commands that are delivered on the message paths with execution permitted only for active paths. When an interface control check is presented for a command and it is discovered that a path is no longer operational, the path is inactive at the SES facility 16 and the non-operational path is deactivated by the program over an alternate path. Selection and operations of message paths is disclosed in U.S. patent application Ser. No. 07/860,800 filed Mar. 30, 1992 for Means for Ensuring Integrity of State Information of Shared Data at a Local Complex after a Link Error by D. A. Elko et al (Attorney Docket No. PO9-92-003); U.S. patent application Ser. No. 07/860,797 filed Mar. 30, 1992 for "Management of Data Objects Used to Maintain State Information for Shared Data at a Local Complex" by J. A. Frey et al (Attorney Docket No. PO9-92-004); and U.S. patent application Ser. No. 07/860,647 filed Mar. 30, 1992 for "Recovery of Data Objects Used to Maintain State Information for Shared Data at a Local Complex" by J. A. Frey et al (Attorney Docket No. PO9-92-005), all incorporated herein by reference.

Cache cross invalidation is performed by the SES facility 16 when, for instance, a write operation is executed for data in a SES cache 26 that is registered in one or more local caches 24A-24N. Before completing the SES write operation, the SES facility 16 sends a cross-invalidate signal to each system that contains a valid copy of the data in a local cache 24A-24N in order to maintain coherency of the local caches 24A-24N via a selected message path. This is disclosed in U.S. patent application Ser. No. 07/860,805 filed Mar. 30, 1992 for "Sysplex Shared Data Coherency Method and Means" by Elko et al (Attorney Docket No. PO9-91-052), incorporated herein by reference.

Notification of list-state transition is performed by the SES facility 16 when a list operation is executed that causes a list which was empty to become not empty or that causes a list (to be discussed in connection with FIGS. 4 and 6) which was not empty to become empty. In either case, a list-notification command is sent to each system that is monitoring the list, informing the system of the state transition. This is disclosed in U.S. patent application Ser. No. 07/860,809 filed Mar. 30, 1992 for "Method and Apparatus for Notification of State Transitions for Shared Lists of Data Entries" by J. A. Frey et al. (Attorney Docket No. PO9-92-007, incorporated herein by reference.

To be discussed further herein, a fencing command, isolate or isolate using index, is issued by a program running on one CPC and is targeted to a system image located on a target CPC. Execution of the fencing command on the target CPC results in the isolation of the target system, or of a subsystem running on the target system, from resources shared by systems in a syspley, that is, a system having multiple CPCs. Fencing commands are routed to the target by sending the command to the SES facility 16, which forwards the command to the target system image.

The SES facility 16 continuously monitors the state of the physical links used to communicate commands by a message-path status table 43 of FIG. 3. Any failure, temporary or permanent, that may result in the loss of or change in the physical connection causes all the message paths associated with the physical link, as recorded in the message-path status table 43, to be placed in the inactive state. Commands are not sent on these links until the program has renegotiated the connections and reactivated the message paths. This prevents improper connections, such as from movement of cables, from causing commands to be incorrectly routed.

In addition to the SES monitoring function, the program may intentionally deactivate paths or change the associated system identifier. The SES facility 16 serializes these routing configuration changes against delivering new cross-invalidate, list notification or system fencing commands while the renegotiation is in progress.

The path-selection mechanism provided by the message path processor 35 is common to all forwarded and generated commands. The program negotiates the configuration and maintains the routing information independent of the specific command architectures. The command architectures interface with the path-selection mechanism by various means, including attach processing by the cache-structure and list-structure commands and command forwarding by fencing.

Fencing commands are sent from a message facility to the fencing facility by using an intermediate message processor in the SES facility 16 which forwards the command. The use of the intermediate message processor 36 avoids the need for direct connections among the CPCs in a sysplex.

FIG. 3 shows three CPCs and the SES facility 16.

When a fencing command is received at the intermediate message processor, it is forwarded to the fencing facility 30. The path-selection function in the message-path processor 35 is invoked by the intermediate message processor 36 to deliver the fencing command to the specified system.

Figure 4:
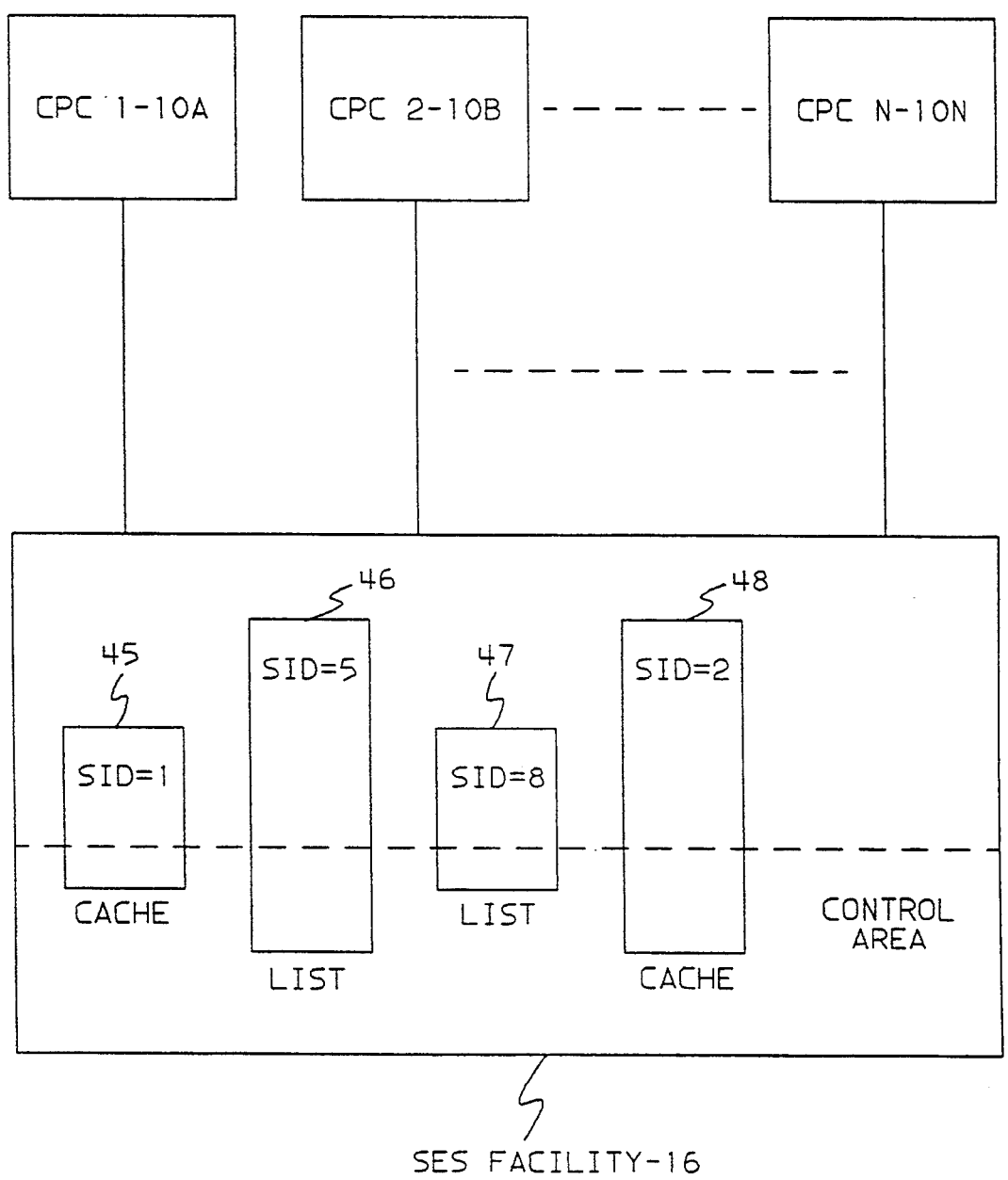
FIG. 4 is another portion of the system of FIG. 1 and shows multiple structures in a SES facility.

FIG. 4 shows a SES facility 16 having multiple structures 45-48. The message processor 37 provides the program with separate storage structures. Among these are the list structure (for example 46 and 47) and cache structure (for example 45 and 48). A set of commands is provided for each structure type, as well as additional commands for referencing global objects, to be discussed. The creation, deletion and attributes of a particular structure are controlled by the program through allocation and deallocation commands. FIG. 4 shows multiple structures of the same type which may exist concurrently. The allocated structures 45-48 reside in separate SES storage locations and are located by a structure identifier (SID). The SID value provides an identification of a target structure by a command. A command of a particular structure type, such as a cache-structure or list-structure command, may only address or alter the contents of a single structure of the given type.

SES storage contains data objects and control objects. The data objects may reside in any storage location, whereas the control objects are generally restricted to the control area.

Figure 5:
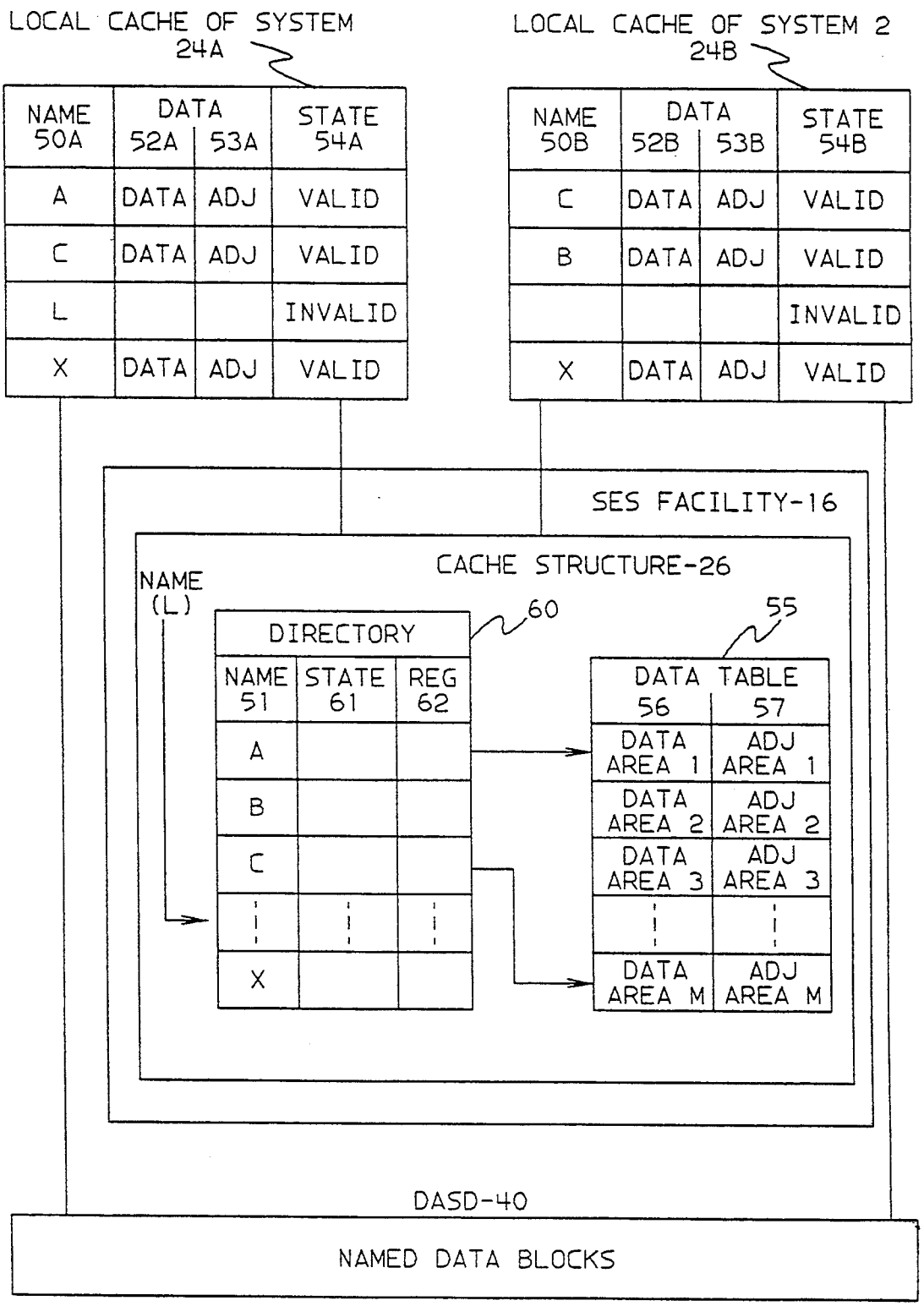
FIG. 5 shows the three-level storage hierarchy of the system of FIG. 1.
Figure 6:
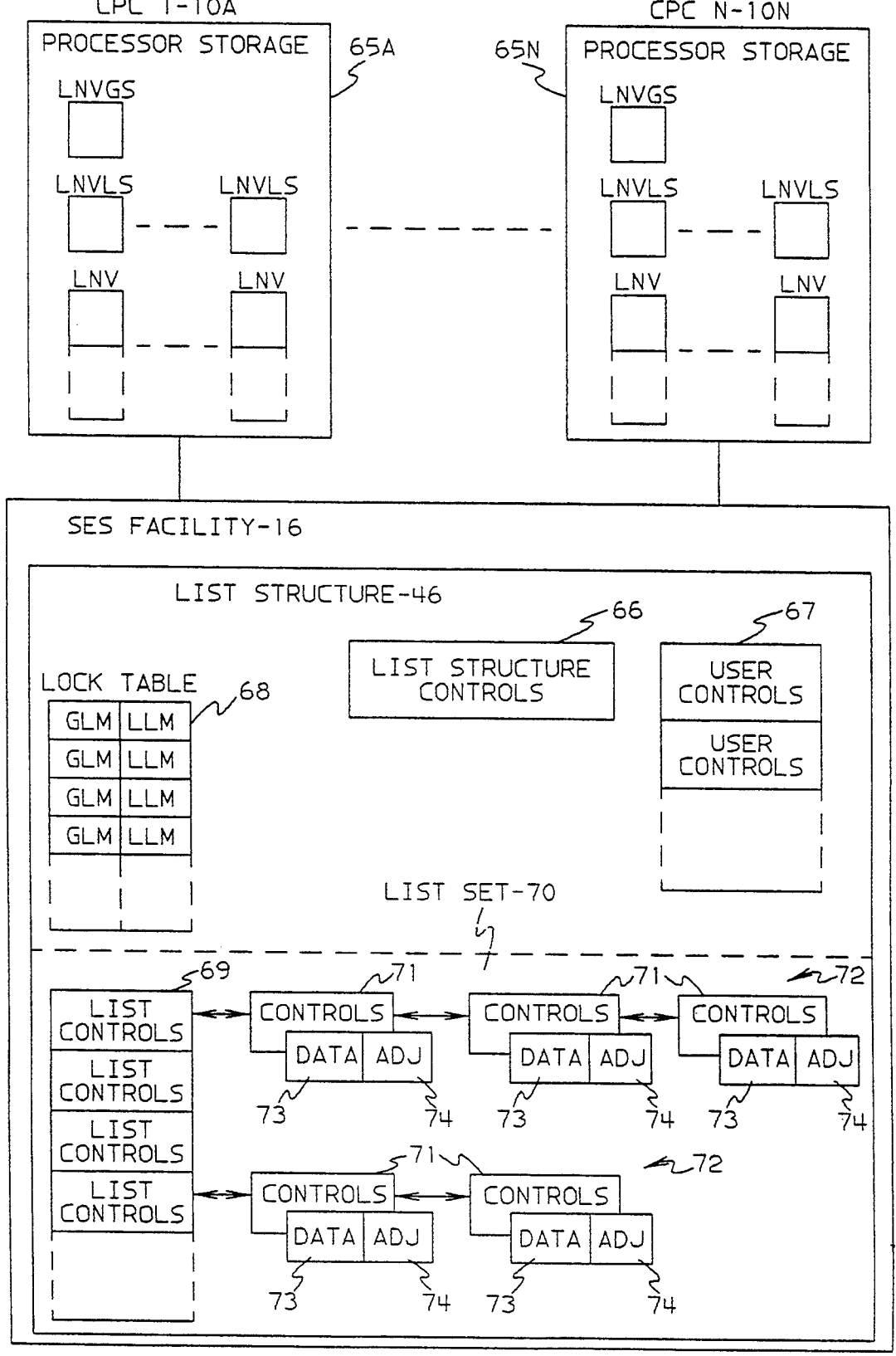
FIG. 6 illustrates one of the list structures of the structures shown in FIG. 4.

The partitioning of the SES storage and control area into structures as shown in FIGS. 4, 5 and 6 is managed by the program. The data objects are organized in tables or lists with an optional adjunct data area. The remaining objects are controls. The relative amounts of storage assigned to data and control objects are determined by program-specified parameters in the allocation commands. One of the cache structures 46 and 48 of FIG. 4 is shown as the SES cache 26 of FIG. 1.

As previously mentioned, each SES cache 26 of FIG. 1 is a component of a three-level storage hierarchy in a network of attached processors 10A-10N. FIG. 5 shows this hierarchy of storage. The lowest level of the hierarchy is DASD 40, the intermediate level is the SES cache 26, and the highest level is the local cache in processor storage. The DASD 40 and SES cache 26 are shared by the processors 10A-10N and are accessed by I/O operations and message operations, respectively. A local cache 24 is defined in each processor 10 and is accessed using CPU instructions.

As discussed in connection with FIG. 1, the processors 10A-10N are connected to the DASD 40 by I/O channels 15A-15N, and to the SES cache 26 by inter-system channels 18A-18N.

Referring to FIG. 5, data that moves through the storage hierarchy is given a name (columns 50A and 50B in the local caches 24A and 24B respectively, and column 51 in the SES cache 26). Data areas in the local caches 24A and 24B are shown in columns 52A and 52B, respectively, and optional adjunct data areas in the local caches 24A and 24B are shown in columns 53A and 53B, respectively. Each entry in the local caches 24A and 24B includes a state indicator shown in columns 54A and 54B, respectively. Each SES cache 26 may include a data table 55 which includes data areas (column 56) and adjunct data areas (column 57). The data sizes are variable with the range of variability being, in one embodiment, between 1 and n times the data-area element size. The data-area element sizes are fixed for each SES cache 26 and are powers of 2 with a minimum size of 256 bytes. An optional field of adjunct data may be associated with the data (columns 53A, 53B and 57). The names of the data (columns 50A, 50B and 51) are 16-byte values assigned by a programming protocol. The data is permanently resident in the DASD storage 40.

Copies or new versions of the data may also reside in any combination of SES-cache storage 26 and/or local-cache storage 24A and 24B. For instance, a data object may reside in SES-cache storage 26 and a subset of local caches 24A-24N, or it may reside in a subset of local caches 24A-24N but not in the SES-cache storage 26.

Each local cache 24A-24N is a processor storage area maintained by the program by utilizing the respective SES-support facility 33 on the CPC containing the local cache vector defined by a DEFINE VECTOR instruction. The DEFINE VECTOR instruction initializes controls in the SES-support facility 33 and assigns a local-cache token.

Each SES cache structure 26 is a structure in the SES facility 16 consisting of a directory 60 and, optionally, a data table 55 having a collection of data-area elements in columns 56 and 57. The directory 60 includes the name column 51 previously mentioned, and a state column 61 for indicating the state of each directory entry, and a register column 62 for pointing from each entry in the directory 60 to an entry in the data table 55. Each cache structure is designated by a structure identifier SID. Each SES cache structure in the SES cache 26 is created by an allocate-cache-structure command. The command is issued by an initialization procedure within the program which determines the attributes of the SES cache structure: size and number of data-area elements, number of directory entries, number of storage classes, and number of castout classes.

A local cache 24 is attached to the SES cache 26 by the attach-local-cache command that initializes controls in the SES facility 16 and associates the local cache with a set of paths over which the SES facility 16 issues generated commands to the SES-support facility 33, as discussed in connection with FIG. 2. A local cache 24 is attached to a SES cache structure 26 so that it may participate in the storage hierarchy. Coherency of copies of the data in the local caches 24A–24N and the SES cache 26 is maintained by controls in the SES cache 26 and enforced by cross-invalidate commands issued as generated commands to the various SES-support facilities 33 in their respective CPCs 10A–10N. The building of a set of paths in the SES facility is disclosed in U.S. patent application Ser. No. 08/860,646 filed Mar. 30, 1992 for "Message Path Mechanism for Managing Connections Between Processors and a Coupling Facility" by Elko et al (Attorney Docket No. PO9-92-006), incorporated herein by reference.

The directory 60 is a collection of directory entries arranged as a fully associative array. The directory entries are partitioned into storage classes. The subset of changed directory entries is partitioned into castout classes. Whenever a named data object is placed in the higher two levels of the hierarchy (SES cache 26 and local cache 24) its state is recorded in the state column 61 and its location is recorded in the register column 62 by the SES-cache directory. State information indicates whether the data is changed, unchanged, or locked for castout, or resident in the SES-cache storage 26. Location information includes which of the local caches 24A–24N contains a copy. Certain SES-read and SES-write commands register the local-cache copy in the SES-cache directory. SES-write and SES-invalidate commands remove the registration and invalidate local copies.

When the data is located in the local cache 24, the state of the data is either valid or invalid. The valid state of local cache entries is maintained by controls in the SES-support facility 33. The data is validated by CPU instructions and invalidated by SES-write and SES-invalidate operations. The valid state of the data is tested by a CPU instruction. A valid named data object must be registered in the SES-cache directory 60 in order to maintain local cache coherency. Local-cache coherency is maintained by the invalidation process. A registered local-cache entry may test as invalid. This is referred to as overindication of the invalid state and is permitted. This is disclosed in the aforementioned U.S. patent application Ser. No. 07/860,800.

The SES-cache storage 55 is normally smaller than the DASD storage 40. Thus, periodically the changed data must be transferred from the SES cache 26 to the backing DASD 40. This process, called castout, is controlled by the program and involves the following operations:

A SES-read for castout operation is issued that sets the castout serialization and copies the data block to main storage which may or may not be put in the local cache 24.

An I/O operation is executed that copies the data block to DASD 40.

A SES-unlock castout locks operation is issued that releases the castout serialization.

Multiple castout processes may coexist for a single one of the local caches 24A–24N. Whenever data is locked for castout, an identifier for the local cache 24A–24N and an identifier for the castout process are placed in the directory 60. This is disclosed in U.S. patent application Ser. No. 07/860,806 filed Mar. 30, 1992 for "Management of Data Movement from a SES Cache to DASD" by Elko et al (Attorney Docket No. PO9-91-079), incorporated herein by reference.

The least recently used unchanged data and directory resources are reclaimed by the SES cache 26 when needed to meet new requests. The data objects are mapped into one of several storage classes by the program. Each storage class has a reclaiming vector that controls the reclaiming process. This allows the allotment of SES storage among the storage classes to be dynamically adjusted to account for changes in workload characteristics. The reclaiming vector is maintained by the program. This is disclosed by U.S. Patent application Ser. No. 07/860,807 filed Mar. 30, 1992 for "Storage Element for a Shared Electronic Storage Cache" by Elko et al (Attorney Docket No. PO9-91-078), incorporated herein by reference.

FIG. 6 shows the connection of CPCs 10A–10N to the SES facility 16 wherein each CPC 10A–10N includes processor storage 65A–65N, respectively. The contents of one list structure 46 of FIG. 4 is shown in FIG. 6. It will be understood that the other list structures of the SES facility would be the same as the list structure shown in FIG. 6.

The list structure 46 comprises list-structure controls 66, user controls 67, and, optionally, a lock table 68, and/or a list set 70 with list controls 69 and list-entry controls 71.

Each lock table 68 consists of a sequence of one or more entries, which are numbered consecutively starting at zero. The list-structure type determines whether all the lock-table entries have a global-lock-manager GML object, a local-lock-managers LLM object, or both.

The list-structure controls 66 are initialized when the list structure 46 is created. The list-structure controls 66 contains attributes of the structure, such as the structure size, list-structure type, lock-table-entry count, non-zero-lock-table-entry count, lock-table-entry size, list count, list-element size, the list-set-entry count, user-identifier vector and user controls, shown separately at 67.

The user controls 67 are created and initialized when the list-structure user is attached. The user controls 67 contain a list-notification token, system identifier, user-attachment control, and user state.

The list set 70 includes one or more lists represented by list controls 69, which are numbered consecutively starting at zero.

There are list controls 69 associated with each list 72. The list controls 69 contain a list-entry count, a listentry-count limit, a list-monitor table, a list-state-transition count, and a user list control.

Each list 72 consists of a sequence of zero or more entries. The list-structure type determines whether all the list entries in the list set 70 have a data list entry 73, an adjunct list entry 74, or both.

One of the mentioned list-entry controls 71 is associated with each entry of a list 72. The controls 71 contain list-entry-location information and other information for managing the data in the adjunct area 74.

The list commands provide a means for writing a lock-table entry: that is a command may compare global-lock managers GLM and conditionally replace a global-lock manager GLM, a local-lock manager LLM, or both the global-lock and local-lock managers GLM and LLM. The list commands also provide a means for reading an entry in the lock-table 68 or the next nonzero lock-table entry, or for clearing a lock table 68.

The list commands also provide a means for conditionally creating, reading, replacing, moving, or deleting one entry in a list 72. A number of comparisons may be requested during these processes. They include a list-number comparison, a version-number comparison, a global-lock-manager GLM comparison, or any combination of the preceding. Additionally, when global locks are compared, local locks LLM may be compared. A list entry may be moved from one list 72 to another within the same structure 46 or from one position to another within the same list 72. This is disclosed in U.S. patent application Ser. No. 07/860,655 for "Method and Apparatus for Performing Conditional Operations on Externally Shared Data" by D. A. Elk et al (Attorney Docket No. PO9-92-008), incorporated herein by reference.

The position of a list entry in a list 72 is determined when it is created, and may be changed when any entry in the list is created, deleted or moved. A list entry or list-entry position is located within a list set 70 by means of a list-entry identifier, an optional list-entry name, or by position.

A list-entry identifier is unique to a list set 70 and is assigned by the SES facility 16. A list-entry name is unique to a list set 70 at any particular instant and is provided by the program. The position is specified by means of a list number, a direction, and an optional list-entry key.

When list-entry keys exist, the keyed list entries are ordered by key with the lowest numerical key at the leftmost position. Elements with the same key value may be located by first or last within the same key value.

When an unkeyed list entry is created or moved, the target list-entry position is always located by unkeyed position. When a keyed list entry is created or moved, the target list-entry position is always located by keyed position and first or last within the same key value.

The list commands also provide a means for synchronously writing and moving, moving and reading, or reading and deleting one entry of a list 72. More than one list entry may be deleted synchronously, and more than one data list entry 73 or adjunct list entry 74 may also be read synchronously. The data list entry 73 is always returned in the data area designated in main storage by the message-operation block. The adjunct list entry is returned in either the message-response block or the data area, depending on the command. This is disclosed in U.S. patent application Ser. No. 08/860,633 filed Mar. 30, 1992 for "Apparatus and Method for List Management in a Coupled Data Processing System" by J. A. Frey et al. (Attorney Docket No. PO9-92-009), incorporated by reference.

Normally, a data list entry 73 contains application-program data, and an adjunct list entry 74 contains the control data associated with it.

List monitoring is a SES list function which is optionally requested by a list-structure user by means of the attach-list-structure-user and the register-list-monitor commands. The attach-list-structure-user command identifies to the SES, the system on which the list-structure user resides and the list-notification vector LNV associated with the user. The register-list-monitor command allows the user to begin monitoring a list. This is disclosed in the aforementioned U.S. patent application Ser. No. 07/860,809.

Each processor storage 65A–65N includes a list-notification-vector global summary LNVGS, multiple list-notification-vector local summary LNVLS entries, and multiple list-notification vectors LNVs. The list-notification vector LNV is created by the DEFINE VECTOR instruction. The sizes or the LNVs may vary among different list users. The LNV is attached to the SES list structure 46 by means of the attach-list-structure-user command. Each entry in an LNV may be associated with a list 72 in the SES list structure 46. List transitions from the empty to non-empty and non-empty to empty states are detected by periodically polling the appropriate entry in the LNV from the CPU. The TEST VECTOR ENTRY instruction is provided for this purpose.

A LNV entry is set to 1 as a result of a list transition to the empty state. It is set to 0 as a result of a list transition to the non-empty state.

For each LNV created on the CPC there exists a list-notification-vector local summary LNVLS. As a program specified option, the LNVLS is placed into the active state when any list-notification command is processed against the associated LNV indicating an empty to non-empty list transition. The LNVLS is not updated as a result of an non-empty to empty list state transition. The update of the LNVLS is specified through use of a list-notification command option. The LNVLS is tested by the TEST VECTOR SUMMARY instruction and set or reset by the SET VECTOR SUMMARY instruction.

On a CPC there exists one list-notification vector global summary LNVGS per CPC image. The LNVGS is not updated as a result of a non-empty to empty list state transition and is set when-any LNVLS is set by a list-notification command. The LNVGS is tested by the TEST VECTOR SUMMARY instruction and set or reset by the SET VECTOR SUMMARY instruction.

When a user is monitoring a list, the empty to not-empty and not-empty to empty state transitions of the list result in the SES facility 16 issuing a list notification command to the system which initiated the user attachment.

The list-notification command causes the specified list-notification-vector LNV entry to be updated to reflect the empty or not-empty state of the monitored list 72. The list-notification command may also cause the specified list-notification-vector global summary LNVGS and list-notification-vector local summary LNVLS to be updated to reflect the not-empty state of the monitored list 72.

Figure 7:
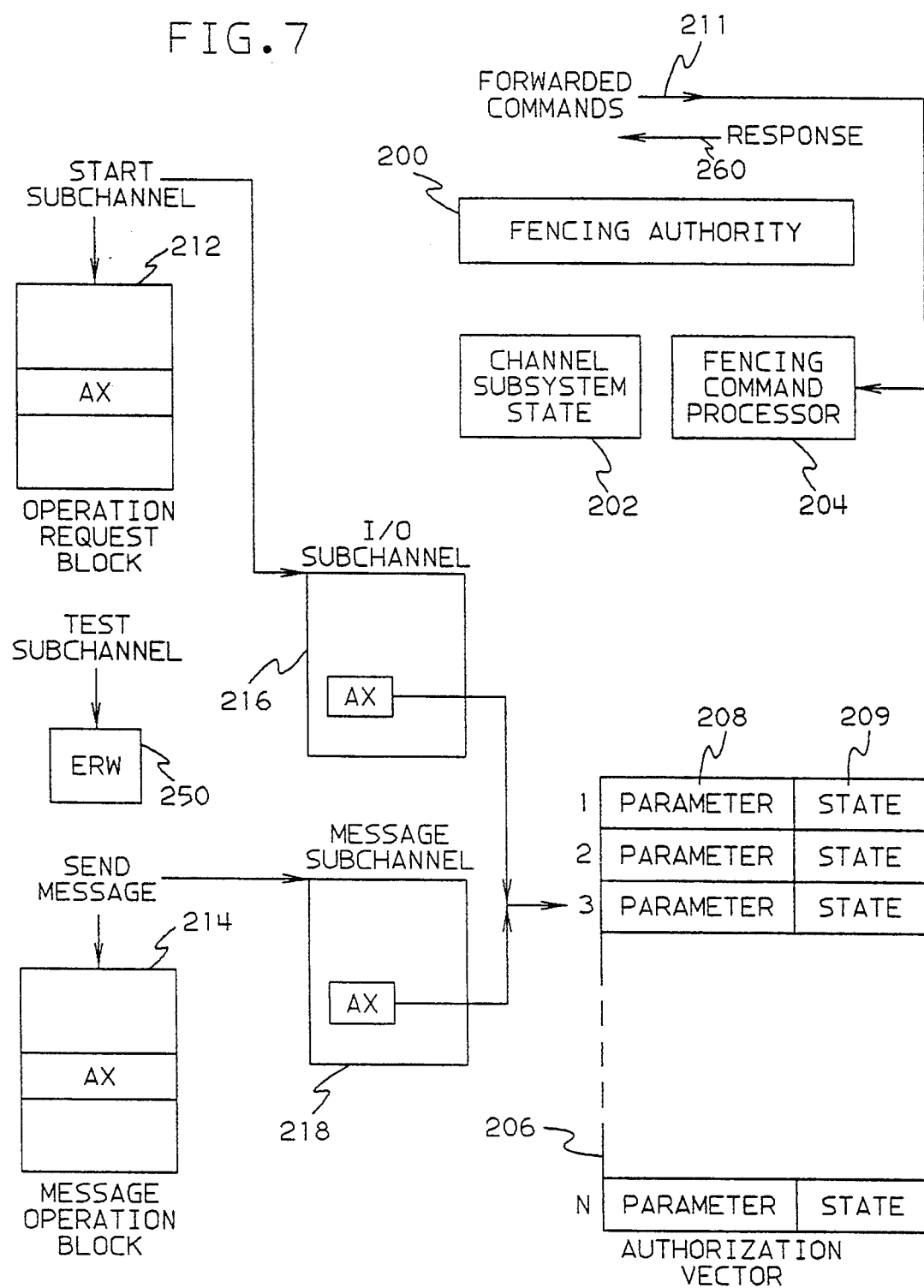
FIG. 7 is a block diagram of the fencing facility of FIG. 2 and its interconnection with the channel-subsystem of the data processing system of FIG. 1, the fencing facility having a channel subsystem state and a multiple element authorization vector, each element having a state field.

FIG. 7 is a block diagram showing the fencing facility 30 of FIG. 2 and how the fencing facility 30 interconnects with the channel subsystem of the data processing system of FIG. 1. The fencing facility 30 comprises a fencing authority 200, a channel subsystem state 202, a fencing command processor 204, and a multiple entry authorization vector 206. Each entry of the authorization vector 206 is referred to hereinafter as an authorization vector element. Each authorization vector element includes a parameter 208 and a state 209. As shown at 211, forwarded commands are executed at the fencing command processor, which maintains and minipulates the objects of the fencing facility 30 including the fencing authority 200, channel subsystem state 202, authorization vector 206 and its elements.

A start subchannel operation for an I/O operation makes use of an operation request block 212 which contains an authorization index (AX) value, and a send message operation for message operations makes use of a message operation block 214 which also contains an AX value. As is known, the I/O operation uses an I/O subchannel 21, and the message operation uses a message subchannel as described in the aforementioned U.S. patent application Ser. No. 07/860,308, PO9-91-006. The AX value from the operation request block 212 is stored in the I/O subchannel 216, and the AX value from the message operation block 214 is stored in the message subchannel 218. The AX value addresses the desired authorization vector element, as shown, for the operation, either an I/O operation or a message operation.

The fencing authority 200 controls whether any fencing command which modifies the fencing objects can be processed by the fencing command processor 204, as will be explained. The channel subsystem state 202 determines whether any I/O or message operations can be initiated, as will be explained. The authorization vector 206 limits the scope of a fencing to a particular subsystem, as will be explained. The parameter field 208 in each element of the authorization vector 206 is used in the assignment and release of each element to insure its uniqueness. The fencing commands are used to change the state in the state field 209 of a particular element of the authorization vector to one of several states which control the initiation of message and I/O operations, as will be discussed later. As previously mentioned, the authorization vector element is accessed by an AX value for the I/O or message operation from the operation's respective subchannel 216 or 218.

I/O-Authorization Facility

Fencing is the term used to describe the program-controlled capability for interdicting (fencing) I/O and message operations. The I/O-authorization facility, also referred to herein as the fencing facility, performs fencing to assist in the isolation of failing operating systems and operating-system components (subsystems). When a recovery program takes over a failing operating system or subsystem, the I/O-authorization facility is used to prohibit I/O and message operations that would otherwise be active or initiated on behalf of the failing program.

The I/O-authorization facility performs fencing commands that are received from other CPCs. Such commands are issued when a program at another CPC assumes the responsibilities of a failing program at the CPC housing the I/O-authorization facility. The commands isolate the failing program and terminate its I/O and message operations.

FIG. 3 shows three CPCs with I/O-authorization facilities installed. They are part of a sysplex that includes other CPCs (not shown) with fencing facilities. Two modes of isolation are provided at each CPC: identified requests and CPC (all) requests. The first mode uses an authorization vector, while the second uses the channel subsystem state 202 of FIG. 7.

Fencing Actions

The message facility described in the aforementioned U.S. patent application Ser. Nos. 07/860,380 and 07,860,646, attorney dockets PO9-91-006 and PO9-92-006, respectively, are used for initiating actions at a fencing facility. Typically, such an action modifies the state of the associated I/O-authorization facility (see FIG. 3). The action is specified by information from a message-command block in main storage. The message-command block specifies a fencing command that is sent to the designated fencing facility for execution.

For a given CPC, each I/O-authorization facility is represented by one or more message subchannels. The message subchannels specify message paths which connect to the facility through a SES facility. Message paths are channel paths for messages (paths from the CPC through a SES to a fencing facility in FIG. 3) using the message subset of the serial protocols disclosed in U.S. patent application Ser. No. 07/839,651 filed Feb. 20, 1992 for "Configurable, Recoverable Parallel Bus" by Bartow et al (Attorney Docket No. PO9-91-066) and U.S. patent application Ser. No. 07/839,652 filed Feb. 20, 1992 for "High Performance Intersystem Communications for Data Processing Systems" by Bartow et al (Attorney Docket No. PO9-91-067) both incorporated herein by reference. Message CHPIDs are part of the I/O CHPID set, but they are dedicated to the message function.

Fencing-Delivery Process

When a valid intermediate fencing command is received by the SES facility, the fencing command is forwarded to the specified system by the fencing-delivery process. Fencing delivery consists of path selection, forwarded-command processing, and intermediate-command completion.

An active message path is selected from the path group. If the path group is empty or if all paths in the path group are inactive, the fencing command is not forwarded.

The storage objects and processes are accessed using commands issued by the program. Each command has two parts:

A message-command block containing a message header, request operands and reserved area.

A message-response block containing a response descriptor, response operands and reserved area.

Once a path is selected, a message-command block (MCB) is created for the forwarded fencing command and issued on the selected message path.

The forwarded fencing command is completed when a message-response block is received.

If successful completion of the forwarded fencing command has not occurred after all paths have been tried, an exception response is returned for the intermediate fencing command.

Fencing-delivery processing is completed when one of the following has occurred:

A forwarded fencing command has been completed, and the message-response block has been copied to the intermediate message-response block.

There are no active message paths in the path group when path selection occurs.

The forwarded MCB has timed out on each message path in the path group.

Fencing Operands

This section defines the fencing operands.

AUTHORIZATION INDEX (AX): An unsigned binary integer that designates an element in the authorization vector. Valid values range from 1 to the maximum index.

FENCING AUTHORITY (FA): An value that is compared with the value in the fencing-authority storage object or written into the object.

I/O-TERMINATION CONTROL (OTC): A value that controls the initiation of the I/O-termination process. The following values are defined:
0 No action initiated
1 Initiate I/O termination
2 Initiate immediate I/O termination MESSAGE HEADER: A field that is generated by the intermediate message processor and sent to the fencing facility along with program-specified command information.

SYSTEM IDENTIFIER (SI): A value that designates a collection of paths from the intermediate message processor to the fencing facility.

VECTOR ELEMENT (VE): A value that is read from an authorization-vector element.

Fencing Reception for PR/SM

A set of fencing objects, an authorization vector, a channel-subsystem-state control, a fencing authority and a maximum-index value, exist for each channel-subsystem or image in a PR/SM environment. The value of the IID field in the message header of the forwarded command identifies the guest image and the set of fencing objects to be referenced. When a forwarded fencing command is received by the fencing facility, the fencing command is processed, and a message-response block is returned to the SES facility.

The I/O-authorization facility maintains a fencing-authority value, channel-subsystem-state indicator, and an authorization vector, that participate in the execution of fencing commands.

Fencing Authority Value

Integrity mechanisms at the I/O-authorization facility permit the local operating system to regulate access to fencing capabilities. Three integrity mechanisms are provided: explicit fencing activation, fencing authority, and enforcement of internal interface requirements. These mechanisms together provide protection for the CPC in two ways:

1. Processors external to the control of the operation staff but with attachments to the CPC cannot cause an unsolicited fencing operation to be accepted and processed by the CPC.
2. Fencing is performed only by systems which explicitly ask for the function and is not activated until the program is in a state such that it can process the fencing status conditions.

Explicit Fencing Activation

The facility is activated explicitly by issuing the activate fencing command. This ensures that a fencing condition can be handled properly by the program—that is, the program has completed initialization. It also allows a failed system to complete a diagnostic routine that collects log and dump data without interference from a subsequent fencing operation. Finally, it releases operating systems which have not incorporated the fencing function from being required to handle a fenced condition on an I/O or message operation.

Fencing Authority (FA): When the fencing authority object value is nonzero, the fencing facility is in the active state, and all of the fencing commands are executed normally. When the value is zero, the facility is in the inactive state, and fencing commands except test authorization index and read facility parameters are suppressed.

Activate Fencing Command (ACTF)

The fencing-facility processes are activated.

The value in the fencing-authority object is, under certain conditions, replaced by the value in the fencing-authority operand.

If the value in the object is zero, the value in the operand is written in the object.

If the value in the object is not zero, the value is not changed.

The control program issues the activate-fencing command to the fencing facility at its CPC, specifying a nonzero fencing-authority value, to complete a fencing-initialization procedure. It distributes the fencing-authority value to control programs at other CPCs to authorize them to take fencing actions that affect it or its subsystems.

A control program can preclude any fencing actions against it or its subsystems by setting the fencing-authority value to nonzero without distributing the value to other control programs.

The activate-fencing command can be used to test the fencing-facility state. This is done by setting the fencing-authority operand to zero. The facility state is active when a successful response is received and inactive when an exception response is received.

Commands that make a store-type reference to a fencing object provide a fencing-authority value as an operand. The command is suppressed if the value does not match the contents of the fencing-authority object.

No command allows any program to read the value in the fencing-authority object.

The fencing-authority object is set to zeros during I/O-system reset.

Figure 8:
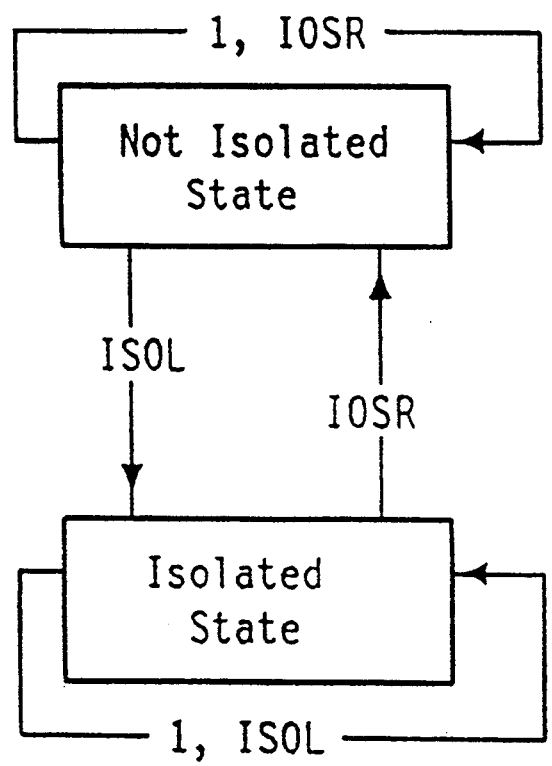
FIG. 8 is a representation showing the effects of fencing commands on the state of the channel subsystem state of the fencing facility of FIG. 7.

Channel Subsystem State:

The channel-subsystem state controls the initiation of all I/O and message operations. The channel-subsystem state is isolated or not isolated as shown in FIG. 8. In FIG. 8, ISOL indicates an isolate command, IOSR indicates an I/O system reset, and 1 indicates any command other than the isolate command. The initial channel-subsystem state is not isolated.

Not Isolated: When the channel subsystem is in the not-isolated state, the initiation of I/O and message operations is permitted, subject to a test which uses the authorization vector.

Isolated: When the channel subsystem is in the isolated state, all I/O and message operations have been terminated, and no new I/O or message operations are initiated.

CSS Isolation: The I/O-authorization facility provides the capability for isolating the channel subsystem. Communication with the device is not initiated if the channel subsystem is in the isolated state when a START SUBCHANNEL or SEND MESSAGE instruction is issued.

The channel subsystem is placed in the isolated state by a fencing command (isolate). All I/O and message operations are terminated, and the channel subsystem does not initiate any new I/O or message operations. An I/O reset operation is performed to remove all reserve and allegiance conditions at attached devices. This action isolates the CPC, which remains isolated until I/O-system reset is performed.

Authorization Vector

The I/O-authorization facility regulates access to I/O and message operations. When a recovery program takes over for a failing operating system or operating system component, the authorization facility is used to terminate active operations and prohibit the initiation of I/O and message operations on behalf of the failing program.

The authorization vector 206 is a sequentially numbered set of elements. Each element holds a value consisting of a program-specified parameter 208 and a state description 209. Element zero is not used and specification of zero by the program circumvents the authorization check.

The parameter field of the authorization-vector element is specified by the program and is preserved unchanged until the parameter is reset or replaced by a new program-specified value.

Figure 9:
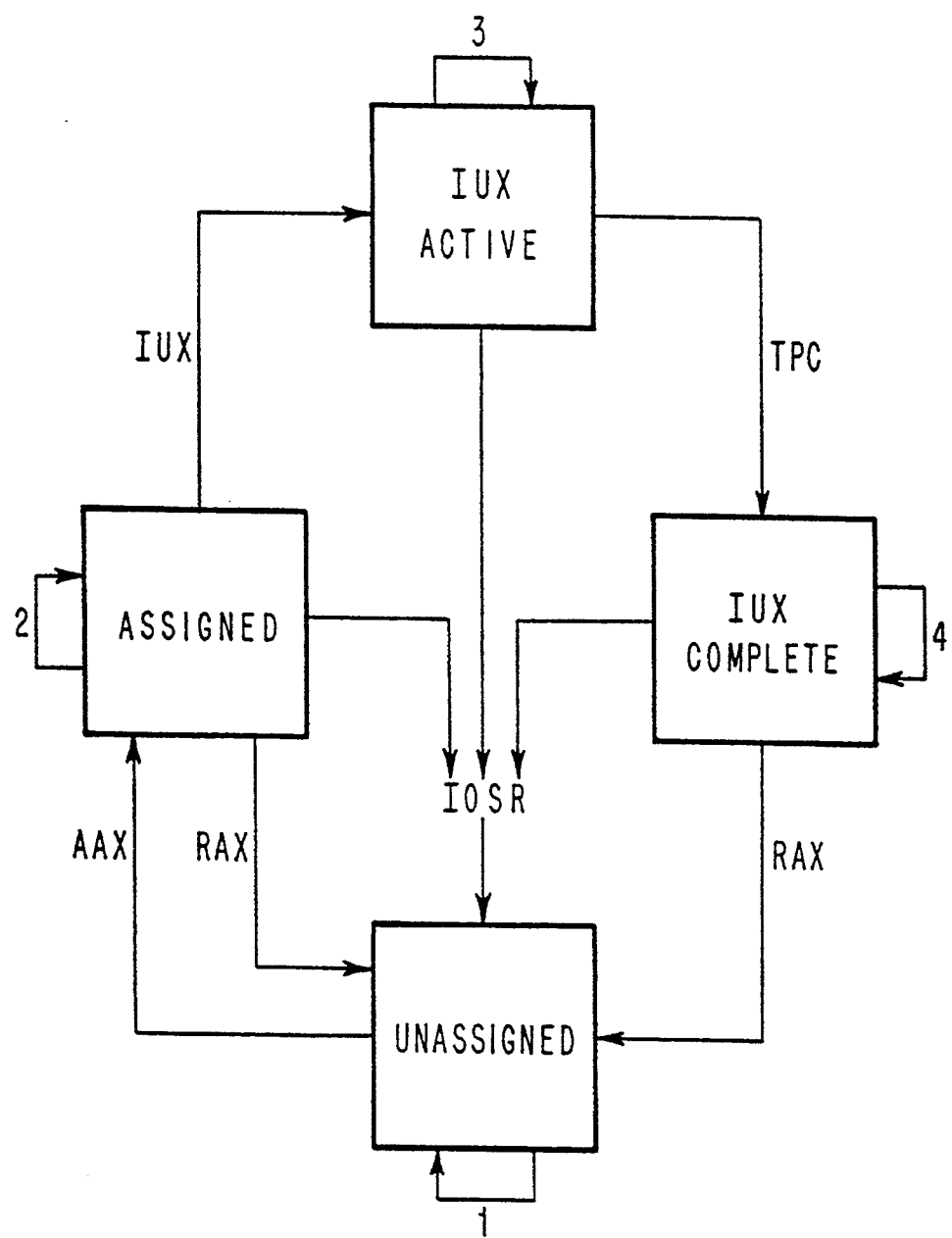
FIG. 9 is a representation showing the effects of fencing commands on the state field of an authorization-vector element of FIG. 7.

The state field indicates the state of the authorization-vector element. The possible states as shown in FIG. 9 are:

Unassigned
Assigned
IUX active
IUX complete

Assigned: The authorization-vector element has been assigned to a program for use in the initiation of I/O and message operations. Execution is permitted for I/O and message operations that specify an assigned element.

Unassigned: The authorization-vector element is available for assignment. Execution is not permitted for I/O and message operations that specify an unassigned element other than element 0.

IUX Active: An isolation process has been initiated for an assigned authorization-vector element. Execution is not permitted for I/O and message operations that specify an element that is IUX active.

IUX Complete: An isolation process has been completed for an assigned authorization-vector element, and the element has not been released. Execution is not permitted for I/O and message operations that specify an element that is IUX complete.

The maximum authorization vector index is an unsigned binary integer that specifies the highest-numbered element in the authorization vector.

The value of the maximum index is set by an installation procedure. It is not modified by any fencing-facility command.

The Read Facility Parameters (RFP) command returns fencing-facility limits. The maximum index for the authorization vector is stored in the authorization-index operand, and a successful response code is stored.

The authorization vector in the I/O-authorization facility is also used to regulate access to I/O and message operations. The state is changed when the appropriate fencing command (isolate-using-index (IUX)) is received with a matching parameter value—the function is not complete until all I/O and message operations associated with the authorization-vector element are ended as specified by the I/O termination control specification with the command. The initiation of subsequent I/O and message operations with the same authorization-vector element are interdicted until the program releases and reassigns the element.

The authorization-vector elements are set to zeros during I/O-system reset.

Authorization Vector Element Assignment

The assign-authorization-index command places an unassigned authorization-vector element in the assigned state and stores, as specified by the program, the parameter 208, in the element. The parameter is large enough to enable programming to assign a unique value in order to detect authorization vector element reuse. The parameter is a required operand on an isolate-using-index (IUX) command that specifies the element. Thus, an element can be reassigned with a new parameter value, thereby preventing any latent IUX command from affecting the state of the element after reassignment occurs.

The control program allocates authorization indices to control-program components or subsystems. When a subsystem requests the assignment of a currently unassigned authorization index, the control program selects an index, sets the parameter value in the authorization-vector element, and places the associated authorization-vector element in the assigned state. Once assignment is complete, the control program returns a fence token corresponding to the assigned authorization vector element to the subsystem.

The subsystem is responsible for ensuring that all the system services which perform I/O or message operations on behalf of the subsystem are provided with the fence token. For instance, the access methods must supply the fence token to IOS whenever an I/O operation is performed for the subsystem, and the subsystem must supply the token to the system support services for SES services whenever a message operation is performed. This is accomplished by the subsystem passing the token to the access method when the data sets are opened, and by passing the token to the system support service for SES when the subsystem initiates SES requests. Thus the subsystem may be effectively fenced by invalidating a single token.

The program may voluntarily relinquish the element or may fail requiring a fencing action. In the first case, the control program releases the index, placing it in the unassigned state. In the second case, the control program isolates the index by issuing an IUX command with the specified parameter. In either case, new operations that specify the index will be rejected until the element is returned to the assigned state.

An authorization index may be allocated, then deallocated, and then reallocated, this time for a different program. Reallocation cannot occur until the authorization-vector element is placed in the unassigned state. When reallocation occurs, the parameter value is changed to a unique value by the program in the authorization-vector element to prevent latent IUX commands against the previous assignment of the index.

An authorization index is available for assignment when the state at the corresponding authorization-vector element is unassigned. The control program changes the state at the authorization-vector element to assigned when it allocates the authorization index to a subsystem.

The state of the authorization-vector element is changed to IUX-active when the I/O-and-message termination process is initiated for the associated authorization index. This is done by issuing the isolate-using-index command.

The state of the authorization-vector element is changed to IUX-complete when the I/O-and-message termination process is completed by the channel subsystem.

The control program determines the state of the authorization-vector element by issuing the test-authorization-index command.

FIG. 9 shows how the fencing commands affect the state of an authorization-vector element. In FIG. 9, TPC indicates termination process complete, 1 indicates TAX, RAX, IUX and I/O system reset, 2 indicates TAX and AAX, 3 indicates TAX, AAX, RAX and IUX, and 4 indicates TAX, AAX, and IUX, to be explained.

Assign Authorization Index (AAX) Command

A designated authorization index is placed in the assigned state and the parameter is initialized.

When the value in the fencing-authority object is nonzero and matches the value in the fencing-authority operand, then the state of the designated authorization-vector element is tested.

When the element is in the unassigned state, then the value in the parameter operand is stored in the parameter field of the element, the element is placed in the assigned state.

When the element is not in the unassigned state, then the contents of the element are unchanged, and an exception response code is stored.

If the authorization index is invalid or if the value in the fencing-authority object is nonzero and does not equal the value in the fencing-authority operand, an exception is recognized.

If the value in the fencing authority object is zero, an incorrect facility state is recognized.

Release Authorization Index (RAX) Command

The designated authorization index is placed in the unassigned state.

When (1) the value in the fencing-authority object is nonzero and matches the value in the fencing-authority operand, and (2) the value in the parameter object of the designated authorization-vector element is equal to the value of the parameter operand, then the state of the designated authorization-vector element is tested.

When the element is in the assigned state or IUX-complete state, then the parameter in the element is set to zeroes, the element is placed in the unassigned state, and a successful response code is stored.

When the element is not in the assigned or IUX-complete state, then the contents of the element are unchanged. The element contents are placed in the vector-element-value operand, and an exception response code is stored.

When (1) the value in the fencing-authority object is nonzero and matches the value in the fencing-authority operand, and (2) the value in the parameter object of the designated authorization-vector element is not equal to the value of the parameter operand, then the contents of the element are unchanged. The element contents are placed in the vector-element-value operand, and an error response code is stored.

If the authorization index is invalid or if the value in the fencing-authority object is nonzero and does not equal the value in the fencing-authority operand, an exception is recognized.

If the value in the fencing-authority object is zero, an incorrect-facility-state condition is recognized.

Test Authorization Index (TAX) Command

The state and parameter of the designated authorization index are returned.

The contents of the designated authorization-vector elements are stored in the vector-element value operand, and a successful response code is stored.

If the authorization index is invalid, an exception is recognized

When the termination process is initiated for the I/O and message operations associated with an authorization index, the channel subsystem places the corresponding authorization-vector element in the IUX-active state.

The channel subsystem changes the state to IUX complete when all I/O and message operations associated with the authorization index have been terminated.

Test authorization index is used to determine when the termination process is complete.

Test authorization index may be used for dumping and debugging purposes. It does not use a fencing-authority operand.

I/O and Message Instruction

An authorization index is specified in the operation-request block for I/O operations and the message-operation block for message operations. When the authorization index specified for START SUBCHANNEL or SEND MESSAGE is nonzero, the operation is suppressed when the designated authorization-vector element is not in the assigned state. When the element is in the assigned state and the channel subsystem is not in the isolated state, the operation is initiated and the index is stored at the subchannel for use in the termination process I/O and for message operations.

The subchannel is made status-pending with subchannel condition code zero and authorization check when:
1. The channel subsystem state is in the isolated state; or
2. The authorization index is nonzero, but the designated authorization-vector element is not in the assigned state.

CPC isolation and identified-request isolation are reported to programming through a condition code or SEND MESSAGE and START subchannel and through subchannel status pending.

Programming uses the test subchannel CPU instruction to store an Error Report Word (ERW) 250 of FIG. 7. The ERW contains the authorization check indication.

I/O-Termination Control

An I/O-termination control is associated with each fencing command, and controls the forced termination of active operations by the fencing facility. When a fencing command is processed, the I/O-termination control is also specified.

One of three values is possible: no termination requested, termination at command boundaries, and immediate termination. Specifying no termination allows I/O operations to complete normally and avoids truncation of a channel program. Specifying termination at command boundaries allows the program to force the termination of very long channel programs with minimum disruption. Specifying immediate termination allows the program to force the completion of channel programs that do not complete in a timely manner, for example, channel programs that do not complete due to hardware failures that require hardware recovery actions.

Isolate Command

Hereinafter, the term CPC isolation means having placed the channel subsystem state 202 in the isolated state. The I/O-authorization facility at the designated (remote) CPC is able to place the CPC in an isolated state. The CPC enters the isolated state when it receives the isolate command. The function is not complete until all message and I/O operations are ended at the CPC. Thereafter, new I/O and message operations cannot be initiated until system reset is performed at the CPC.

An I/O reset function is performed on every I/O channel path before completion of the CPC-isolation-command to remove reserve and allegiance conditions for the fenced CPC at attached control units (14A-14N of FIG. 1).

The isolate command is used to remove a failed system from the sysplex. The isolate command prohibits all I/O and message operations, including those which do not have any associated fence token. A system which is isolated cannot perform any useful functions; the program action on an isolated CPC is to load a wait-state PSW in every processor.

The isolate command places designated channel subsystem in the isolated state.

When the value in the fencing-authority object is nonzero and matches the value in the fencing-authority operand, the channel-subsystem state is set to isolated, and the I/O termination process is conditionally initiated. If the value of the I/O termination control is 0 and the I/O termination process is not in progress, the I/O termination process in not initiated. If the value of the I/O termination control is 1, the I/O-termination process is initiated or continued. If the value of the I/O-termination control is 2, the immediate-I/O-termination process is initiated or continued.

When I/O termination is in progress and the value of the I/O-termination control is 0, no action is taken. The I/O-termination process is continued. When immediate I/O termination is in progress any valid setting of the I/O-termination control will continue the immediate-I/O-termination process.

The channel subsystem is signaled to asynchronously perform the I/O-termination process. The I/O-termination process is summarized below.

A successful response code indicates that all I/O and message operations are terminated. An exception response code indicates that the termination process is incomplete. Programming monitors for fencing completion by periodically issuing an isolate command and testing the resulting response (see 260 of FIG. 7).

Subsequent to the execution of the isolate command, the channel subsystem asynchronously initiates the I/O and message termination functions. Upon completion, a reset signal is issued on every I/O channel path of the channel subsystem.

If the value in the fencing-authority object is zero, an incorrect facility state is recognized.

If the value in the fencing-authority object is nonzero and not equal to the value in the fencing-authority operand, or if the I/O-termination control contains an invalid value, an exception is recognized.

When certain control-program failures occur, the isolate command is issued as part of the recovery process to prohibit the initiation of I/O and message operations on behalf of the failing program. The program performing the recovery action issues the isolate command to the fencing facility at the CPC containing the failing program. When the fencing facility has placed the channel subsystem in the isolated state, I/O or message operations are no longer initiated at the CPC.

An exception response code is stored for the isolate command when the I/O-termination process is prolonged. The program reissues the command until a successful response code is stored.

Multiple issuances of the isolate command allow the program to introduce a time delay between the setting of the channel-subsystem state and the initiation of the I/O-termination process. When the isolate command is first issued, the I/O-termination control is set to 0; upon subsequent issuance of the isolate command after the time delay, the I/O-termination control is set to 1. Introducing this delay permits active I/O and message operations to complete normally while preventing the initiation of new operations.

Immediate I/O termination forces outstanding operations to completion by invoking recovery processes in the channel subsystem. Delaying the initiation of immediate I/O termination after the initiation of normal I/O termination allows the channel subsystem time to complete long-running I/O operations at a command boundary. Immediate I/O termination may result in the abrupt termination of operations during command execution.

Identified-Request Isolation

The state of an element changes from assigned to IUX active by an IUX command when a compare on the parameter is successful. Changing the state of a particular assigned authorization-vector element prohibits all the I/O and message operations for the subsystem while permitting other operations. This isolates the subsystem but allows other subsystems to continue.

Identified-request isolation is needed as independent workloads are consolidated on large systems. The ability to isolate one workload without affecting the others is critical. For example, a system may have a primary IMS workload and 1,000 TSO users. The primary workload is monitored by a takeover system. When IMS fails, the alternate IMS assumes the workload. However, the failed IMS must be isolated from the database and the SES facilities. If system fencing is available, the primary IMS can be isolated and the alternate can assume the workload without impacting the TSO users. If fencing is not available, the alternate IMS cannot begin accepting new transactions until the CPC running the failed IMS is reset. All of the TSO sessions are then lost.

An isolate-using-index fencing command is issued from another CPC to terminate all I/O and message operations associated with a designated authorization index. In addition, the channel subsystem does not initiate any new operations associated with the authorization index. These actions isolate a program running on the CPC, but permit other programs to continue to initiate I/O and message operations.

When it is necessary to prohibit I/O and message operations for the subsystem, the isolate-using-index command is used to place the authorization-vector element in the IUX-active state, and to initiate the termination process for I/O and message operations associated with the index. Then SEND MESSAGE and START SUBCHANNEL instructions using the index are suppressed before any action is initiated at an I/O or message device.

The isolate using index command places the designated authorization index in the isolated state.

When (1) the value in the fencing authority object is nonzero and matches the value in the fencing-authority operand, and (2) the designated authorization-vector element is in the assigned or IUX-active state, then the parameter at the element is compared to the parameter operand.

If the value in the element is equal to the value in the operand, the state of the authorization-vector element is made IUX active, the I/O termination process is conditionally initiated, and successful response code is stored. If the value of the I/O-termination control is 0 and the I/O-termination process is not in progress for the element, the I/O-termination process is not initiated. If the value of the I/O-termination control is 1, the I/O-termination process is initiated or continued. If the value of the I/O-termination control is 2, the immediate-I/O termination process is initiated or continued.

When I/O termination is in progress for the element and the value of the I/O-termination control is 0, the I/O-termination process is continued. When immediate I/O termination is in progress for the element any valid setting of the I/O-termination control will continue the immediate-I/O-termination process.

When the element is not in the assigned or IUX-active state, then the contents of the element are unchanged. The element contents are placed in the vector-element-value operand, and an exception response code is stored.

When (1) the value in the fencing-authority object is nonzero and matches the value in the fencing-authority operand, and (2) the value in the parameter object of the designated authorization-vector element is not equal to the value of the parameter operand, then the contents of the element are unchanged. The element contents are placed in the vector-element-value operand, and an error response code is stored.

A successful response code indicates that all I/O and message operations are terminated. An exception response code indicates that the termination process is incomplete. Programming monitors for fencing completion by periodically issuing an isolate using index command and testing the resulting response (see 260 of FIG. 7).

Subsequent to the execution of the isolate-using-index command, the channel subsystem asynchronously initiates the I/O and message termination functions. Once the authorization index is placed in the IUX-in-progress state, I/O and message operations are terminated.

If the authorization index is invalid, the value in the fencing-authority object is nonzero and does not equal the value in the fencing-authority operand, or the I/O-termination control contains an invalid value, an exception is recognized.

If the value in the fencing authority object is zero, an incorrect facility state is recognized.

When failures occur in control-program components or in subsystems, isolate using index is issued to prohibit I/O and message operations on behalf of the failing subsystem. The program performing the recovery action issues the isolate-using-index command to the fencing facility at the CPC of the failing subsystem.

Multiple issuances of the isolate-using-index command allow the program to introduce a time delay between the setting of the IUX-active state and the initiation of the I/O-termination process for the element. When the isolate-using-index command is first issued, the I/O-termination control is set to 0, upon subsequent issuance of the isolate-using-index command after the time delay, the I/O-termination control is set to 1. Introducing this delay permits active I/O and message operations for the element to complete normally while preventing the initiations of new operations for the element.

Immediate I/O termination forces outstanding operations to completion by invoking recovery processes in the channel subsystem. Delaying the initiation of immediate I/O termination after the initiation of normal I/O termination allows the channel subsystem time to complete long-running I/O operations at a command boundary. Immediate I/O termination may result in the abrupt termination of operations during command execution.

I/O and Message Termination

The control program issues the isolate-using-index command to terminate selected I/O and message operations. An authorization index (AX) is specified in the command. The designated authorization-vector element is placed in the IUX-active state before terminating any operations. The channel subsystem places the element in the IUX-complete state when the termination process is complete.

The program issues the isolate command to isolate the CPC and terminate all I/O and message operations. The channel subsystem enters the isolated state before terminating any operations. This prevents the initiation of I/O and message operations after the termination process is started.

Affected Subchannels

The term affected subchannel refers to a message or I/O subchannel that satisfies either of the following sets of conditions:
1. All of the following:
   a. The subchannel is associated with a logical partition that is performing an isolation operation that was initiated by an isolate-using-index command.
   b. The value of the authorization index at the subchannel is the same as that presented by the isolate-using-index command.

2. Or the following:
   a. The subchannel is within a channel-subsystem image that is performing an isolation operation that was initiated by an isolate command.

Message-Termination Function

The message-termination process ensures that active communication is concluded at all affected message subchannels.

Termination when active communication is underway: When send function is indicated at a message subchannel, active communication is underway if command information has been sent, or may have been sent, on the path selected for communication, but neither of the following has been recognized:

An ending or command-nullification signal at the path. Busy and command-rejection signals are examples of signals indicating command nullification.

An interface-control-check or channel-control-check condition for the operation.

When the message-termination process is performed, the operation at the subchannel may proceed to completion; or it may be terminated by recognizing an interface-control-check condition and making the subchannel status-pending with subchannel condition code 0, interface-control check, and authorization check indicated.

Termination when active communication is not yet initiated: When send function is indicated at a message subchannel, the channel subsystem is preparing for active communication when one of the following holds:

Command information has not been sent to the message device, or

Command information was sent to the device, and a command-nullification signal was recognized at the path used for communication.

When the message-termination processes is performed, the message facility may initiate active communication with the devices; or it may abandon the attempt to initiate communication and make the subchannel status-pending with subchannel condition code 1 and authorization check initiated.

Termination when active communication has ended: When a message subchannel is status-pending, then active communication with the message device has ended. When the message-termination process is performed, no action is taken with respect to the subchannel.

Termination when clear function is indicated: When clear function is indicated at a message subchannel and the message-termination process is performed, then the clear function is allowed to proceed to completion.

Termination when the subchannel is idle: When a message subchannel is in the idle state and the message-termination process is performed, no action is taken with respect to the subchannel.

The termination function for message operations is complete when all affected message subchannels have been placed in the idle or status-pending state.

I/O-Termination Function

Subsequent to the execution of the isolate or isolate-using-index command, the channel subsystem performs the I/O-termination function for all affected subchannels.

The action taken and status conditions raised for each affected subchannel are as follows:

I/O Operations is Terminated with a Clear Signal: The affected subchannel is made interruption pending and status pending with primary, secondary, and alert status; channel-control check is indicated in the subchannel status field; a clear signal is issued to the device; and the termination code is set to 2. This occurs in the following cases:

1. The affected subchannel is subchannel active and has a working allegiance on a parallel byte-multiplexer channel path. For this case, the authorization-check indicator is set in the ERW;
2. The affected subchannel is subchannel active and has an active allegiance to a path that is not a parallel byte-multiplexer and immediate termination has been requested. For this case, the authorization-check indicator is set in the ERW;
3. The subchannel is not an affected subchannel, but recovery for an operation on an affected subchannel when immediate termination is requested causes an operation on this subchannel to be terminated. The authorization-check indicator is not set.

I/O Operation is Terminated without a Clear Signal: The affected subchannel is made interruption pending and status pending with primary and alert status; channel-control check is indicated in the subchannel status field; the authorization-check indicator is set in the ERW; and the termination code is set to 1. If device end is presented while status is still pending, secondary status may be included. If device end is presented while the subchannel is only device active, the subchannel is made interruption pending and status pending with secondary status. This occurs in the following cases:

1. The affected subchannel is subchannel active, has an active allegiance to a path that is not a parallel byte-multiplex channel, the current command is not the last command of the current channel program, and immediate termination has not been requested. The operation proceeds normally until channel end is presented to the subchannel. At this time, the device is signalled that no chaining is to be performed. If device end is presented with channel end, then secondary status is included.
2. The affected subchannel is subchannel active and has a working allegiance, but not an active allegiance, to a path that is not a parallel byte-multiplexer channel. The subchannel is immediately made interruption pending. When device end is subsequently presented and accepted, chaining is not indicated to the device.

No Attempt is Made to Terminate the I/O Operation: The channel subsystem does not force the termination of an I/O operation for an affected subchannel if the following condition exists:

1. The affected subchannel is subchannel active, has a working allegiance on a path that is not a parallel byte-multiplexer channel, the current command is the last command of the current channel program, and immediate termination has not been requested. The operations completes as if the subchannel were unaffected. No special conditions are indicated in the interruption-response block (IRB).

For some termination circumstances, the architecture specifies that a clear signal is issued to the device. For these circumstances the program is not required to test for unit check and perform a sense operation. However, for those termination circumstances that do not specify that a clear signal is issued to the device, it is the responsibility of the program to test for unit check and perform a sense operation.

No special action is required for the suspended state since the I/O-authorization checking by the resume function will produce the desired result once the isolate command has either changed the channel-subsystem state or the state of the authorization-vector element.

No special action is required for the start-pending and resume-pending cases, since the I/O authorization checking by the resume function and start function will produce the desired result once the isolate operation has either changed the channel-subsystem state or the state of the authorization-vector element.

The fencing facility executes fencing-facility commands received from other CPCs even when the channel subsystem is in the isolated state.

The termination process continues after the response is made to the isolate-using-index command, so an isolate command may be received before the process is complete. When the termination process for isolate using index is abandoned in favor of the comprehensive termination process for the isolate command, the state of the authorization-vector elements designated by isolate using index is set to IUX complete at the end of the comprehensive process.

Returning an I/O-termination-incomplete response for an isolate command allows the channel subsystem to scan its subchannels for a limited period of time. This avoids timeouts and service lock outs for I/O operations. The termination process may continue after the response is made, or it may resume when the program reissues the command.

The preferred implementation is to continue the I/O-and-message-termination process after the response is made for the isolate command. This reduces the time needed to complete a system takeover.

The preferred implementation of the message-termination process is to complete the operations at the affected subchannels without disruption. The link signaling for an interface-control-check condition is usually slower than allowing normal completion.

While we have illustrated and described the preferred embodiment of our invention, it is to be understood that we do not limit ourselves to the precise construction herein disclosed, and the right is reserved to all changes and modifications coming within the scope of the invention as defined in the appended claims.

Having thus described our invention, what we claim as new, and desire to secure by Letters Patent is:

1. A data processing system comprising:
   one or more central processing complexes (CPCs) each CPC comprising;
   a main memory divided into one or more partitions, each partition including an operating system, each operating system supporting program means initiating interdiction operations by sending fencing commands, and one or more subsystems initiating I/O and message operations;
   a central processor,
   a channel subsystem having one or more facilities for conducting I/O and message operations,
   a fencing facility in said channel subsystem for interdicting I/O and message operations responsive to fencing commands sent thereto, said fencing facility comprising;

reporting means for reporting to said CPC which of the I/O and message operations have been interdicted by said fencing facility,
   monitoring means for indicating the completion or incompletion of a previously initiated interdiction operation to the operating system which sent the fencing command to said fencing facility,
   authorization vector means for regulating access to said I/O and message operations, said authorization vector means having multiple logical vector entries, each logical vector entry having a parameter and addressed by an authorization index, said authorization vector means including means for assigning an authorization index and parameter for each I/O and message operation to be initiated by said subsystems, and
   means for allowing said interdiction operations of said I/O and message operations only for those fencing commands having a parameter operand matching the parameter of the logical vector entry which is addressed by the authorization index of the I/O and message operation to be interdicted.

2. The data processing system of claim 1 wherein said fencing facility includes means for concurrently interdicting all I/O and message operations of the operating system sending fencing commands to said fencing facility.

3. The data processing system of claim 1 further comprising scope means in said fencing facility for specifying either a subsystem or a channel subsystem whose I/O and message operations are to be interdicted.

4. The data processing system of claim 1 further comprising fencing authority means in said fencing facility for protecting subsystems and CPCs from unauthorized fencing commands sent to said fencing facility.

5. The data processing system of claim 4 further comprising channel subsystem state means in said fencing facility for controlling the initiation of the said I/O and message operations.

6. The data processing system of claim 5 wherein each channel subsystem state means includes:
   isolated state means for indicating that I/O and message operations are being interdicted by said fencing facility and preventing new I/O or message operations from being started by said channel subsystem.

7. The data processing system of claim 6 wherein said channel subsystem state means further includes non-isolated state means for indicating the initiation of I/O and message operations are permitted.

8. The data processing system of claim 5 further comprising an I/O system reset which places said channel subsystem state means in a non-isolated state.

9. The data processing system of claim 5 wherein said fencing commands include an isolate command for changing said channel subsystem state means from a not-isolated state to an isolated state as permitted by said fencing authority means.

10. The data processing system of claim 9 wherein said channel subsystem state means includes retry means for retrying the issuance of fencing commands from said program means to said fencing facility.

11. The data processing system of claim 9 wherein said isolate command further comprises an I/O termination control means for controlling the interdiction operations of said fencing facility, said I/O termination control means for providing different priorities of I/O termination control, including immediate termination wherein said fencing facility immediately terminates an I/O operation, termination at a specified program boundary wherein said fencing facility terminates an I/O operation at a specified boundary, and no termination requested wherein said fencing facility does not terminate an I/O operation.

12. The data processing system of claim 11 further comprising:
I/O control units having states including allegiances and reserves for conducting I/O operations; and
wherein said CPC further comprises I/O reset means for resetting states of said I/O control units upon termination of an I/O operation by the isolate command.

13. The data processing system of claim 4 further comprising an I/O system reset in said fencing facility which places said fencing authority means in an initialized state.

14. The data processing system of claim 1 wherein said CPC supports one or more operating system images, and further comprises fencing authority means, channel subsystem state means and authorization vector means for each image.

15. The data processing system of claim 1 wherein each of said logical vector entries has a state field, said data processing system further comprising:
first change allowing means in said fencing facility controlled by said fencing authority means for allowing said state fields in said logical vector entries of said authorization vector means to be changed from certain values to certain other allowed values responsive to fencing commands having proper authority as determined by said fencing authority means; and
said fencing commands include an assign authorization index (AAX) command
for changing the state field of a designated logical vector entry of said authorization vector means from a value representing an unassigned state to a value representing an assigned state as permitted by said first change allowing means, and
for assigning a unique value in the parameter of said designated logical vector entry.

16. The data processing system of claim 15 further comprising:
second change allowing means in said fencing facility for comparing the parameter operand from a fencing command with the parameter in said designated logical vector entry as entered therein by said AAX command for determining when said fencing command has proper authority.

17. The data processing system of claim 16 wherein said fencing commands include:
an isolate using index (IUX) command for changing the state field of said designated logical vector entry in said authorization vector means from a value representing an active state to a value representing an IUX-in-progress state as permitted by said first and second change allowing means.

18. The data processing system of claim 17 wherein said IUX command further comprises an I/O termination control means controlling said fencing facility, said I/O termination control means having different priorities for terminating said I/O operation, said different priorities including immediate termination wherein said fencing facility immediately terminates said I/O operation, termination at a specified program boundary wherein said fencing facility terminates said I/O operation at a specified program boundary, and no termination requested wherein said fencing facility does not terminate said I/O operation.

19. The data processing system of claim 17 wherein said IUX command further comprises retry means for subsequent issuance of a fencing command under program control.

20. The data processing system of claim 17 wherein said IUX command further comprises means for placing in the status field of a logical vector entry in said authorization vector means a value representing an IUX-complete state when I/O and message operations have been interdicted by said fencing facility.

21. The data processing system of claim 20 wherein said fencing commands include:
a release authorization index (RAX) command for changing the state field of said designated logical vector entry in said authorization vector means from a value representing an assigned state, or a value representing an IUX complete state to a value representing the unassigned state as permitted by said first and second change allowing means.

22. The data processing system of claim 15 wherein said fencing commands include:
a test authorization index (TAX) command for testing the state of said designated logical vector entry in said authorization vector means; and
a read facility parameters (RFP) command for returning a maximum authorization index value equal to the maximum number of logical vector entries in said authorization vector means.

23. The data processing system of claim 22 further comprising an I/O system reset which places the state field of a logical vector entry of said authorization vector means to a value representing the unassigned state.

24. The data processing system of claim 1 wherein said reporting means further comprises subchannel status indicating means for indicating that I/O and message operations have been interdicted by said fencing facility, said subchannel status indicating means interrogated by I/O and message commands.

25. The data processing system of claim 1 further comprising:
index register means in said channel subsystem for receiving said authorization index;
instruction issuing means in said subsystems comprising;
means for initiating I/O and message operations by issuing SEND MESSAGE instructions and START SUBCHANNEL instructions, and
authorization index specifying means for specifying said authorization index to be associated with said SEND MESSAGE instructions and said START SUBCHANNEL instructions; and
authorization storing means in said channel subsystem for storing in the index register means, the authorization index from said authorization index specifying means.

* * * * *